United States Patent
Feil

(10) Patent No.: US 10,054,665 B2
(45) Date of Patent: Aug. 21, 2018

(54) TRACKING SYSTEM AND METHOD FOR TRACKING A CARRIER OF A MOBILE COMMUNICATION UNIT

(71) Applicant: OSRAM GmbH, Munich (DE)

(72) Inventor: Henry Feil, Unterhaching (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/560,178

(22) PCT Filed: Mar. 21, 2016

(86) PCT No.: PCT/EP2016/056082
§ 371 (c)(1),
(2) Date: Sep. 21, 2017

(87) PCT Pub. No.: WO2016/150890
PCT Pub. Date: Sep. 29, 2016

(65) Prior Publication Data
US 2018/0088207 A1    Mar. 29, 2018

(30) Foreign Application Priority Data
Mar. 23, 2015    (DE) .......................... 10 2015 205 220

(51) Int. Cl.
*H04B 10/114*    (2013.01)
*G01S 5/16*    (2006.01)
(Continued)

(52) U.S. Cl.
CPC ................. *G01S 5/16* (2013.01); *G01S 1/70* (2013.01); *H04B 10/114* (2013.01);
(Continued)

(58) Field of Classification Search
CPC .......... H04B 10/11–10/116; G01S 5/16; G01S 5/163; G01S 1/70
(Continued)

(56) References Cited

U.S. PATENT DOCUMENTS 9,292,936 B2 *   3/2016 Bronshtein ............. G06T 7/246
2005/0093976 A1 * 5/2005 Valleriano ........... H04N 1/32101
                                                    348/143
(Continued)

FOREIGN PATENT DOCUMENTS

CN    1752768 A    3/2006
CN    202372640 U    8/2012
(Continued)

OTHER PUBLICATIONS

German Search Report based on application No. 10 2015 205 220.6 (7 pages) dated Sep. 23, 2016 (Reference Purpose Only).
(Continued)

*Primary Examiner* — Li Liu
(74) *Attorney, Agent, or Firm* — Viering, Jentschura & Partner mbB

(57) ABSTRACT

A tracking system provides light source(s), a mobile communication unit and light sensor(s) with cameras, and a central control unit at least coupled to the sensor(s). The communication unit receives with its camera an identification information item broadcast by the light source(s) and broadcasts an activation signal, including data correlated with the received item, to the control unit. The control unit determines, based on the signal, at which position the communication unit is arranged and which sensor(s) is arranged relative to the position of the communication unit so that the communication unit can be detected by the camera of the sensor; activates the camera of the detected sensor(s) for providing image information by its camera to the control unit, to determine and identify a carrier of the communication unit at the determined position; and activates sensor(s) coupled to the control unit for tracking the identified carrier of the communication unit.

18 Claims, 3 Drawing Sheets

(51) Int. Cl.
*G01S 1/70* (2006.01)
*H04B 10/116* (2013.01)
*G01S 3/786* (2006.01)

(52) U.S. Cl.
CPC .......... *H04B 10/116* (2013.01); *G01S 3/7864* (2013.01); *G01S 5/163* (2013.01)

(58) Field of Classification Search
USPC .................................. 398/103, 118–131, 172
See application file for complete search history.

(56) References Cited

U.S. PATENT DOCUMENTS

| | | | |
|---|---|---|---|
| 2009/0198371 A1* | 8/2009 | Emanuel | B66F 9/0755 |
| | | | 700/226 |
| 2009/0284366 A1 | 11/2009 | Haartsen et al. | |
| 2010/0054229 A1 | 3/2010 | Thoumy et al. | |
| 2013/0028609 A1* | 1/2013 | Staats | G01S 1/70 |
| | | | 398/130 |
| 2013/0047232 A1* | 2/2013 | Tuchman | H04L 9/3226 |
| | | | 726/7 |
| 2013/0128054 A1* | 5/2013 | Densham | H04N 5/23296 |
| | | | 348/169 |
| 2014/0086590 A1* | 3/2014 | Ganick | G06Q 30/02 |
| | | | 398/118 |
| 2015/0282282 A1* | 10/2015 | Breuer | H05B 37/0272 |
| | | | 315/152 |
| 2017/0104531 A1* | 4/2017 | Aggarwal | H04B 10/116 |

FOREIGN PATENT DOCUMENTS

| | | |
|---|---|---|
| DE | 102010054229 A1 | 6/2012 |
| EP | 2753060 A2 | 7/2014 |
| JP | 2005321208 A | 11/2005 |
| JP | 2012164229 A | 8/2012 |
| JP | 2014506328 A | 3/2014 |
| JP | 2016526675 A | 9/2016 |
| WO | 2012024516 A2 | 2/2012 |
| WO | 2012093241 A1 | 7/2012 |
| WO | 2015000772 A1 | 1/2015 |
| WO | 2015148696 A1 | 10/2015 |

OTHER PUBLICATIONS

International Search Report based on application No. PCT/EP2016/056082 (11 pages and 2 pages of English translation) dated Aug. 17, 2016 (Reference Purpose Only).

Written Opinion of International Search Report based on application No. PCT/EP2016/056082 (6 pages and 5 pages of English translation) dated Aug. 17, 2016 (Reference Purpose Only).

Chinese Office Action based on application No. 201680017380.7 (5 pages) dated Mar. 20, 2018 (Reference Purpose Only).

Japanese Office Action based on application No. 2017549783 (2 pages) dated Mar. 26, 2018 (Reference Purpose Only).

* cited by examiner

TRACKING SYSTEM AND METHOD FOR TRACKING A CARRIER OF A MOBILE COMMUNICATION UNIT

RELATED APPLICATIONS

The present application is a national stage entry according to 35 U.S.C. § 371 of PCT application No.: PCT/EP2016/056082 filed on Mar. 21, 2016, which claims priority from German application No.: 10 2015 205 220.6 filed on Mar. 23, 2015, and is incorporated herein by reference in its entirety.

TECHNICAL FIELD

The present disclosure relates to a tracking system including at least one light source, which is designed to broadcast a unique identification information item associated with the light source using a light signal, and a mobile communication unit having a camera, wherein the mobile communication unit is designed to receive with the aid of its camera the identification information item broadcast by the at least one light source. The present disclosure also relates to a method for tracking a carrier of a mobile communication unit using such a tracking system.

BACKGROUND

Known light-based tracking systems are based on the broadcasting of a unique light identification information item (LID), which can be received and detected by means of a mobile communication unit. For this purpose, the LID is modulated on to the light stream in a manner which is invisible to the human eye. In order to detect the modulated signal with a mobile communication unit, there must be a visual connection (line of sight) between the mobile communication unit and the modulating light source. After reception, the LID is filtered out of the light and demodulated. The LID can itself contain a position information item; however, it can also be provided that the mobile communication unit sends the demodulated LID to a central control unit, which there determines a position specification associated with the LID using a look-up table and transmits it back to the mobile communication unit. The association between LIDs and position information items is stored in the central control unit in advance. In addition to the position information item, any desired additional metadata can be associated with the LID. In addition to the implementation mentioned, in which the look-up table is stored in an external central control unit, the look-up table can also be stored as an integrated part in an application which runs on the mobile communication unit, however. Conversely, the look-up table can also include dynamic information, such as which mobile communication unit has queried which position information item. This allows a dynamic motion profile to be recorded (tracking) and saved with a time stamp (tracing). This motion information can form the basis for a wide range of location-based services and analyses.

This known procedure only works, however, for as long as a line of sight exists between the mobile communication unit and the light source broadcasting the LID. If, for example, a mobile phone is used as a mobile communication unit and after the position query the person using it, the carrier, puts it back into a pocket, for example a trouser pocket, a jacket pocket or a handbag, while a positioning information item is indeed received and can be stored in the system, it can no longer be subsequently determined how the carrier of the mobile communication unit has later changed his position in the room.

Alternatively, there are different wireless radio-based systems, such as WLAN or Bluetooth. With these methods, the position of the transmitter, for example a WLAN Access Point WAC or iBeacon, is known and on the basis of the signal field strength of the received signal (Received Signal Strength, RSSI) the distance between the transmitter and the mobile communication unit can be estimated. In accordance with the rules of trilateration, for a unique positioning at least three different transmission sources are required.

In comparison to a light-based indoor navigation a number of disadvantages are found: on the one hand, a sufficiently large number of radio transmission sources must be installed. In contrast to this, the number of the light sources which are normally already present for lighting is already sufficient. For the required radio transmission sources a source of power must be ensured. In the case of WAC, a mains power supply is required. In the case of iBeacons with lower power consumption, batteries are required, all of which will correspondingly need to be replaced within one year. In contrast to this, during the installation of the lighting a mains power supply is always already available. Finally, in the case of radio-based indoor position solutions an accuracy of only 5 m to 10 m is obtained. In contrast, light-based systems can achieve an accuracy of up to less than 10 cm.

In summary, it can be stated that only the high accuracy of light-based systems allows the capability of tracking mobile receivers, and thus also the carriers of such systems, for example, persons, machines, robots, sufficiently precisely, to enable, for example, location-based services and analyses with high reliability.

SUMMARY

The object of the present disclosure is therefore to extend a tracking system of generic kind, or a generic method for tracking a carrier of a mobile communication unit, in such a way as to enable tracking even without a line of sight between the light source radiating the identification information item and the mobile communication unit.

This object is achieved by a tracking system having the features of patent claim 1 and by a method for tracking a carrier of a mobile communication unit having the features of patent claim 18.

The present disclosure is firstly based on the recognition that tracking is in principle also possible without a line of sight if the mobile communication unit or the carrier of the mobile communication unit is identified for as long as a line of sight exists. This creates the precondition for continuing to track the mobile communication unit, or the carrier of the mobile communication unit, by means of a camera on the basis of the identification, even when a line of sight no longer exists.

The present disclosure is additionally based on the recognition that, for the purpose of providing rooms with efficient, daylight/daytime-based and context-sensitive lighting, in addition to classical motion sensors (PIR Passive Infrared Receivers) camera-based, so-called advanced lighting sensors (ALS) are now used, which, in addition to pure presence detection, are also able to cost-effectively carry out a spectral analysis of the lighting situation (artificial and natural light). With the aid of an intelligent light management system (iLMS), this information can be evaluated and the different light sources can be activated in accordance with the requirements or specifications. In addition to the classical lighting tasks, i.e. the adjustment of a local lighting level, a specific light spectrum and the like, the iLMS can also dynamically change the LIDs broadcast by the light sources, or output other data on a light source in addition to the LID, for example, the above-mentioned metadata.

If a LID is now detected by a mobile communication device and this information is forwarded to the iLMS for querying, then from a look-up table stored in the iLMS, in which a position is assigned to the LID, the system can obtain the position of the mobile communication unit. Then, by means of the ALS, the mobile communication unit or the carrier of the mobile communication unit can be detected in the room, identified and thus continue to be tracked.

In accordance with the present disclosure, a tracking system therefore also includes at least one light sensor with a camera, for example at least one ALS as mentioned above, a central control unit (for example as part of the abovementioned iLMS), which is at least coupled to the at least one light sensor, wherein upon receipt of the identification information item, such as the above-mentioned LID, the mobile communication unit is further designed to broadcast an activation signal to the central control unit for activating a tracking operation, the activation signal including data correlated with the received identification information item. The central control unit is designed to determine, on the basis of the activation signal transmitted by the mobile communication unit, at which position the mobile communication unit is arranged and which at least one light sensor is arranged relative to the position of the mobile communication unit in such a way that the mobile communication unit can be detected by the camera of said light sensor. The central control unit in this arrangement is furthermore designed to activate the camera of the at least one detected light sensor for providing image information by means of its camera to the central control unit, in order to determine and identify a carrier of the mobile communication unit at the determined position. The central control unit is further designed to activate at least one light sensor which is coupled to said central control unit for tracking the identified carrier of the mobile communication unit.

The advantage of the solution according to the present disclosure is that, even if a line of sight no longer exists between the mobile communication unit and the light sources broadcasting the LIDs in the room, or the application for determining the position on the mobile communication unit was terminated or the mobile communication unit was even completely switched off, the mobile communication unit or the carrier thereof can thus continue to be tracked.

It is therefore possible for people and objects that are carrying a mobile communication unit to be tracked, even in places where there is no longer any LID present, for example in areas which are shaded or without a LID installation, or at times at which the lighting is switched off for reasons of energy or cost, or in areas of natural light or outside areas. But this can also be the case if persons move from a floor area with artificial light and LID supply into a room with plenty of natural light.

In a preferred embodiment of a tracking system according to the present disclosure, the at least one light sensor is designed to receive with the aid of its camera the identification information item broadcast by the at least one light source and to send data correlated therewith to the central control unit, wherein the central control unit is designed to determine, from a comparison of the data sent by the at least one light sensor to the central control unit with the data sent by the mobile communication unit to the central control unit, which at least one light sensor is arranged relative to the position of the mobile communication unit in such a way that the mobile communication unit can be detected by the camera of said light sensor.

In an advantageous design, in the central control unit the position of the at least one light sensor is stored, the central control unit being designed to determine, by means of an evaluation of the data sent by the mobile communication unit to the central control unit and a comparison of the evaluated data with the stored position of the at least one light sensor, which at least one light sensor is arranged relative to the position of the mobile communication unit in such a way that the mobile communication unit can be detected by the camera of said light sensor. This design has the advantage that the identification information item broadcast by the light source does not need to be received by the light sensor and sent to the central control unit, as the position of the at least one light sensor, in particular the position of the respective light sensor in relation to the light sources, is already stored in the central control unit.

In this context it is preferred if a look-up table is stored in the central control unit, from which, on the basis of the data sent by the mobile communication unit, information about the position of the mobile communication unit can be determined. In this way, the central control unit particularly easily obtains knowledge of the position of the mobile communication unit.

Alternatively, it can be provided here that the identification information item broadcast by the at least one light source already contains a position specification of the light source. The central control unit is then designed to determine a position of the mobile communication unit from the data sent by the mobile communication unit to the central control unit.

While in the first variant mentioned it is sufficient if the light sources broadcast an identification information item uniquely assigned to them in any case, in the second variant mentioned an activation or design of the light source must be performed to the effect that it already broadcasts information about its position. This requires somewhat more effort in advance.

The mobile communication unit can be further designed to determine the relative solid angle under which the at least one light source, the identification information item of which it receives, is arranged relative to the current position of the mobile communication unit. In this way, the possibility is created in principle that the mobile communication unit can be located more precisely, or can locate itself more precisely.

In particular if a plurality of potential carriers, in particular persons, are considered in the relevant area in which the carrier of a communication unit is to be determined and identified, this helps to make the selection more reliable.

In this context, it is advantageous if the tracking system, in particular the mobile communication unit and/or the central control unit, is designed to take into account the determined relative solid angle when determining the position of the mobile communication unit. In other words, the relative solid angle may be taken into account by the mobile communication unit itself, provided that the relevant programs and computing capacity are provided there. As mentioned, however, this can be particularly easily accomplished in the central control unit, since due to the usually stationary arrangement, more computing capacity can be provided there.

It has proved to be particularly advantageous if in the tracking system, in particular in the mobile communication unit and/or in the central control unit, a predefinable position of the mobile communication unit in the vertical direction is stored, wherein the tracking system, in particular the mobile communication unit and/or the central control unit, is designed to take this predefinable position into account when determining the position of the mobile communication unit. Alternatively, on the part of the tracking system, wherein here again the mobile communication unit and/or the central control unit come into consideration, a corresponding predefinable position can be assumed: if, for example, the mobile communication unit is carried by a person, then as a predefinable position in the vertical direction a height of approximately 1 m above the ground can be assumed or, as in the case of the first variant, stored. But if, for example, it is carried by an automatic vacuum cleaner, for the vertical position a height above the ground of 10 cm to 20 cm is considered. For other types of carriers of a mobile communication unit, other heights can of course be assumed.

Assuming or storing a vertical position of the mobile communication unit enables a carrier of the mobile communication unit to be identified even more reliably, since parallax errors due to detection by the camera of a light sensor can be largely avoided.

The mobile communication unit advantageously includes at least one additional sensor, in particular a magnetic field sensor and/or an acceleration sensor, wherein the tracking system, in particular the mobile communication unit and/or the central control unit, is designed to take into account the measurement values of this at least one additional sensor when determining the position of the mobile communication unit, in particular the absolute position thereof. By using a magnetic field sensor, in particular using three magnetic field sensors, an absolute position of the mobile communication unit can be determined in a known manner. Acceleration sensors can be used to detect movements starting from a reference point. Also, the measurement values of these sensors contribute to a further improvement in the determination of the position of the mobile communication unit and thus to an even more reliable tracking of the same.

The at least one light sensor can be designed to send a corresponding information item to the central control unit when detecting the carrier of the mobile communication unit. This enables the central control unit to be informed of a successful launch of the tracking operation. An evaluation of further data, for example sent by the mobile communication unit, or a corresponding activation of at least one light sensor can then be omitted.

The tracking system, in particular the at least one light sensor and/or the central control unit, can be designed to identify features, in particular size, nature of the carrier, gender, hairstyle, hair color, facial features and/or clothing features, of the carrier of the mobile communication unit, and to take into account said features when tracking the carrier of the mobile communication unit. Suitable software is well-known, for example, from the field of digital cameras. As is obvious to the person skilled in the art, such software can also be used advantageously in conjunction with the present disclosure. If a plurality of these features is determined, it is considerably simplified for the tracking system to continue to track the identified carrier very reliably, even if it is moving in a crowd of people or becomes immersed in such a crowd.

The at least one light sensor may include at least one sensor from the following group of sensors: at least one microphone, wherein the at least one light sensor is designed to identify by means of the at least one microphone an acoustic feature, in particular speech and/or footfall sound of the carrier of the mobile communication unit, and to take said feature into account when tracking the carrier of the mobile communication unit. If the carrier of the mobile communication unit is a device, such as a vacuum cleaner, then its noise emission can also be detected using the at least one microphone and used for further tracking. Additional sensors that the at least one light sensor may include can be a temperature sensor, a humidity sensor and a spectral sensor for carrying out a spectral analysis of a lighting situation.

The central control unit is advantageously designed, on receipt of an activation signal sent by the mobile communication unit with data that are correlated with the identification information item of the at least one light source, to activate the appropriate light source in such a way that it broadcasts a predefined light signal. The predefined light signal can take the form of, for example, flashing or a light output in a different color, i.e. by making a temporary color change. In this way, an information forwarding is provided, which functions via light irrespective of the IT infrastructure. Light sources and light sensors in such a system need not be connected to the same central control unit.

In this context, the at least one light sensor can be designed to receive the predefined light signal and to take it into consideration when tracking the carrier of the mobile communication unit. The consideration takes place in particular in such a way that on detection of such a predefined light signal, the light sensor is informed that a mobile communication unit is arranged in spatial proximity to the corresponding light source, for which a tracking operation must be performed.

The at least one light sensor can also be designed to create a virtual three-dimensional grid structure in a learning process, for defining an orientation of its camera. This allows a more precise determination of the position and the detection of the carrier of the mobile communication unit, and thereby a more reliable identification for the tracking operation.

In this context, the at least one light sensor can be designed, when creating the virtual three-dimensional grid structure, to take into account features of a room in which the at least one light sensor is arranged, in particular, at least one feature from the following group: the position of walls, windows and/or doors, the orientation of walls, windows and/or doors and also the height, width and/or length of the room.

Finally, the mobile communication unit can be designed to send a navigation request to the central control unit, wherein the central control unit is designed, taking into account the current position of the carrier of the mobile communication unit determined by means of the tracking of the carrier of the mobile communication unit, to broadcast a navigation signal to the mobile communication unit and/or at least one light source coupled with the central control unit. This service allows the convenience for a user to be improved, which thus allows navigation to take place even without a line of sight, for example via voice output using the mobile communication unit itself, a headset which is connected to the mobile communication unit, or by the environment, for example by light-based dynamic routing. This extension therefore facilitates navigation without a GPS signal. In particular, persons and objects can also continue to be tracked where there is no longer any LID present. Examples of this have already been identified further above.

Further advantageous embodiments are obtained from the dependent claims.

The preferred embodiments and their advantages presented in connection with the tracking system according to the present disclosure apply equally, where applicable, to the method according to the present disclosure for tracking a carrier of a mobile communication unit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
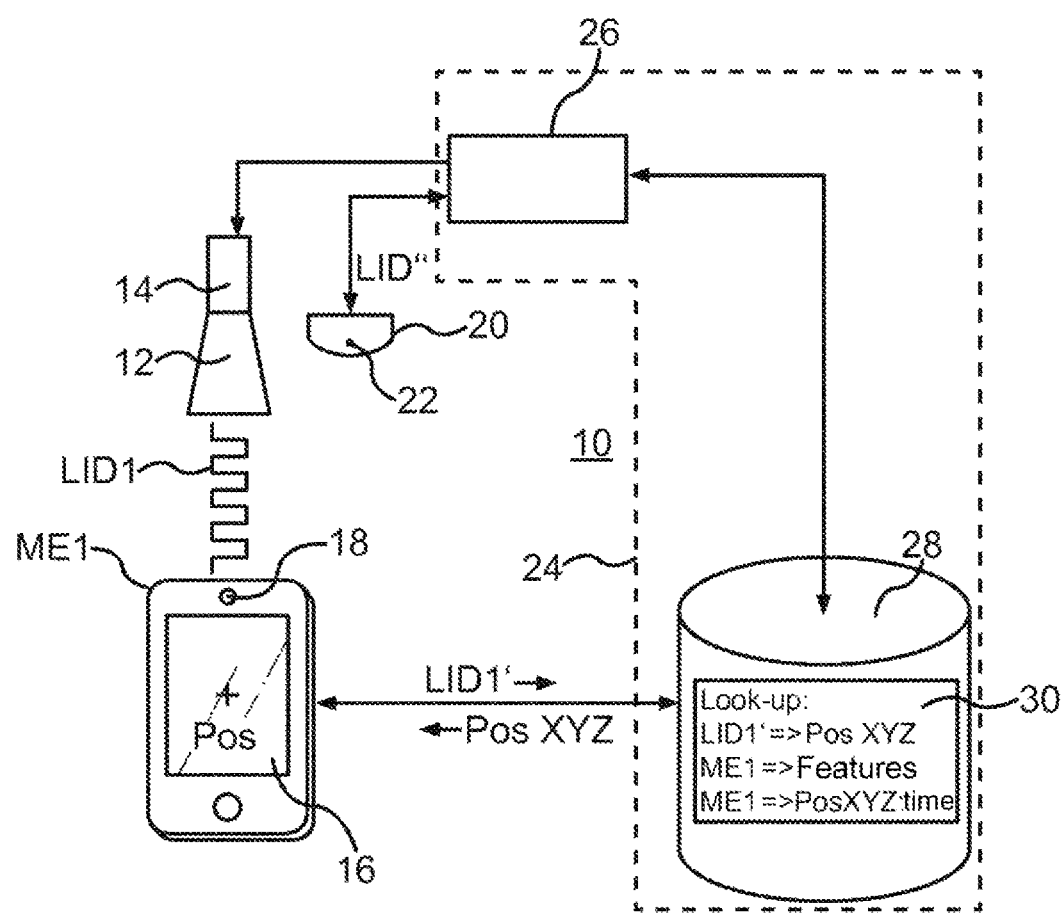
FIG. 1 a first embodiment of a tracking system according to the present disclosure.

FIG. 1 shows a schematic representation of a first embodiment of a tracking system 10 according to the present disclosure. This includes a light source 12 with a modulator 14. The modulator 14 is designed to modulate the light signal with a unique identification information item LID1, associated with the light source 12. Upon receipt of the identification information item LID1, it is therefore possible in principle to infer the specific light source 12, and in particular its position. It can however also be provided that the modulator 14 modulates the light source 12 with an identification information item LID1, which already contains the information relating to the position of the light source 12.

A mobile communication unit ME1, in this case a smartphone, includes a camera 18 and is therefore designed to receive the identification information item LID1 broadcast by the light source 12 by using its camera 18. The tracking system 10 also includes a light sensor 20, which also has a camera 22. A central control unit 24 is also provided, which in the embodiment includes an intelligent light management system (iLMS) 26 and a server 28 with a storage device 30, in which a look-up table is stored. The central control unit 24 is coupled to the light sensor 20 and the light source 12. The mobile communication unit ME1 can communicate with the central control unit 24 in particular via WLAN or Bluetooth or UMTS.

If a specifiable application was launched on the mobile communication unit ME1, the mobile communication unit ME1 is designed to send an activation signal LID1' to the central control unit 24 on receipt of the identification information item LID1 to activate a tracking operation. The activation signal LID1' includes data correlated with the received identification information item LID1.

The central control unit 24 looks up the transmitted activation signal LID1' in the look-up table 30 and then determines a position XYZ for the mobile communication unit ME1. The determined position XYZ is also sent in parallel by the central control unit 24 via the iLMS 26 to the light sensor 20. Using a three-dimensional virtual XYZ grid, which was previously created by the light sensor 20 as part of a learning process or was calculated by using a three-dimensional map, taking into account the position of the light sensor 20 on the ceiling and the dimensions of the room, the camera 22 of the light sensor 20 can record pictures from the mobile communication unit ME1 at the position XYZ and send them to the central control unit 24 for evaluation.

In order to further improve the detection and tracking rate, by using one or more light sensors 20, a three-dimensional model of the object or the carrier of the mobile communication unit ME1 can be created. These features can be stored, see FIG. 1, in the look-up table of the server 28, where they are available for further light sensors 20 to continue tracking the person or object if the latter leaves the room or if the corresponding mobile communication unit ME1 is no longer visible.

This determined position is transmitted by the central control unit 24 back to the mobile communication unit ME1, so that the determined position within an environment is displayed on a monitor 16 of the mobile communication unit ME1. In the look-up table, the identified features and properties mentioned above or further below are assigned to the sender of the activation signal LID1', i.e. the carrier of the mobile communication unit ME1. Furthermore, the central control unit 24 has a clock. In this way, the respectively determined position of the mobile communication unit ME1 can be saved in the central control unit 24 along with a time stamp.

The light sensor 20 receives the same identification information item LID1 by means of a camera 22 and transmits this information to the central control unit 24. Based on a comparison of the activation signal LID1' with the information LID" transmitted by the light sensor 20, the central control unit 24 knows which light sensor 20 is arranged relative to the current position of the mobile communication unit ME1 in such a way that the mobile communication unit ME1 can be detected with the camera 22 of said sensor. The central control unit 24 then activates the camera 22 of the detected light sensor 20 for providing image information by means of its camera 22 to the central control unit 24, in order to determine and identify a carrier of the mobile communication unit ME1 at the determined position.

The central control unit 24 is designed to activate either the light sensor 20 or at least one additional light sensor 20 for tracking the identified carrier of the mobile communication unit ME1.

The transmission of the determined current position XYZ of the mobile communication unit ME1 from the central control unit 24 to the mobile communication unit ME1 and the corresponding display on a monitor of the mobile communication unit ME1 together with environment information, provides support when navigating the mobile communication unit ME1 to a desired location.

The mobile communication unit ME1 can be designed to determine the relative solid angle under which the light source 12, the identification information item LID1 of which it receives, is arranged relative to the current position of the mobile communication unit ME1. This solid angle can be taken into account when determining the position of the mobile communication unit ME1, in particular by the mobile communication unit ME1 itself or the central control unit 24.

The mobile communication unit ME1 may include additional sensors, in particular magnetic field sensors and/or acceleration sensors, wherein the tracking system, in particular the mobile communication unit ME1 and/or the central control unit 24, can be designed to take into account the measurement values of this at least one additional sensor when determining the position of the mobile communication unit ME1. To identify additional properties of the carrier of the mobile communication unit ME1, the signals received by the camera 22 of the light sensor 20 can be evaluated in the light sensor 20 itself or in the central control unit 24, to identify features of the carrier of the mobile communication unit ME1 and to take them into account when tracking the carrier of the mobile communication unit ME1. This relates in particular to the size, the nature of the carrier, the gender, hairstyle, the hair color, facial features and/or clothing features. The light sensor 20 may also include additional sensors, for example at least one microphone, wherein the light sensor 20 can be designed to identify by means of the at least one microphone an acoustic feature, in particular speech and/or footfall sound of the carrier of the mobile communication unit ME1, and to take said feature into account when tracking the carrier of the mobile communication unit ME1. Due to its original function, a spectral sensor is advantageously also arranged in the light sensor 20 for carrying out a spectral analysis of a lighting situation. Additional sensors can be a temperature sensor or humidity sensor.

If the activation signal LID1' is received by the central control unit 24, this can be designed to activate the light source 12 via the iLMS 26, in particular its modulator 14, in such a way that said light source broadcasts a predefined light signal. The light sensor 20, which receives this predetermined light signal, can take this into account when tracking the carrier of the mobile communication unit ME1.

The mobile communication unit ME1 can be designed to send a navigation request to the central control unit 24. The central control unit 24 is designed, taking into account the current position of the carrier of the mobile communication unit ME1 determined by tracking the carrier of the mobile communication unit ME1, to send a navigation signal to the mobile communication unit ME1 and/or to activate at least one light source 12 coupled with the central control unit 24 accordingly. For example, if different light sources 12 are arranged in a large room or in a long corridor, then these can be activated for implementing a light-based dynamic routing.

Figure 2:
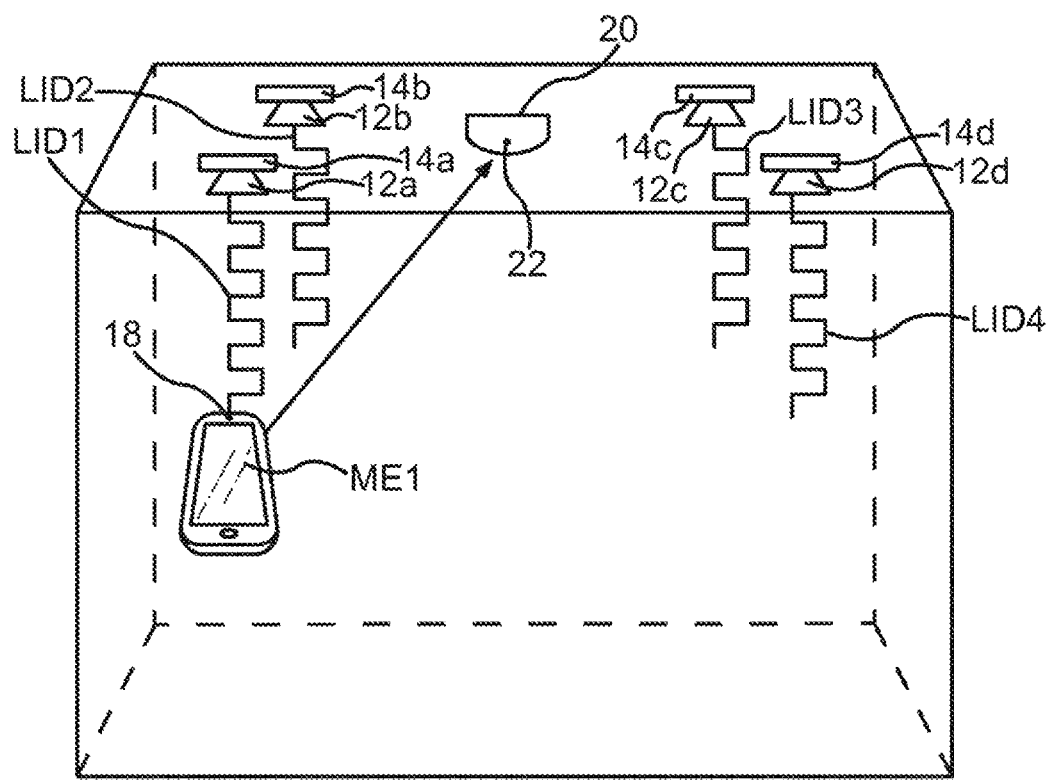
FIG. 2 a second embodiment of a tracking system according to the present disclosure.

FIG. 2 shows a schematic representation of a second embodiment of a tracking system according to the present disclosure. For the sake of clarity, the central control unit 24 has been omitted. The situation shown is that different light sources 12a to 12d with corresponding modulators 14a to 14d are arranged in a room. The different light sources 12a to 12d emit different identification information items LID1 to LID4 with their light signal. In the central control unit 24, the fact is stored that the specific light sensor 20 with its camera 22 can cover the region in which a mobile communication unit ME1 can receive identification information items LID1 to LID4. The communication unit ME1 can be designed to send to the central control unit 24 as part of an activation signal only data correlated with the identification information item which it receives with the strongest reception level. In this case this is the identification information item LID1 from the light source 12a. The central control unit 24 therefore knows that during the analysis of the image signal provided by the light sensor 20, it must search for the carrier of the mobile communication unit ME1 in the room in the vicinity of the light source 12a, i.e. quite far to the left.

Figure 3:
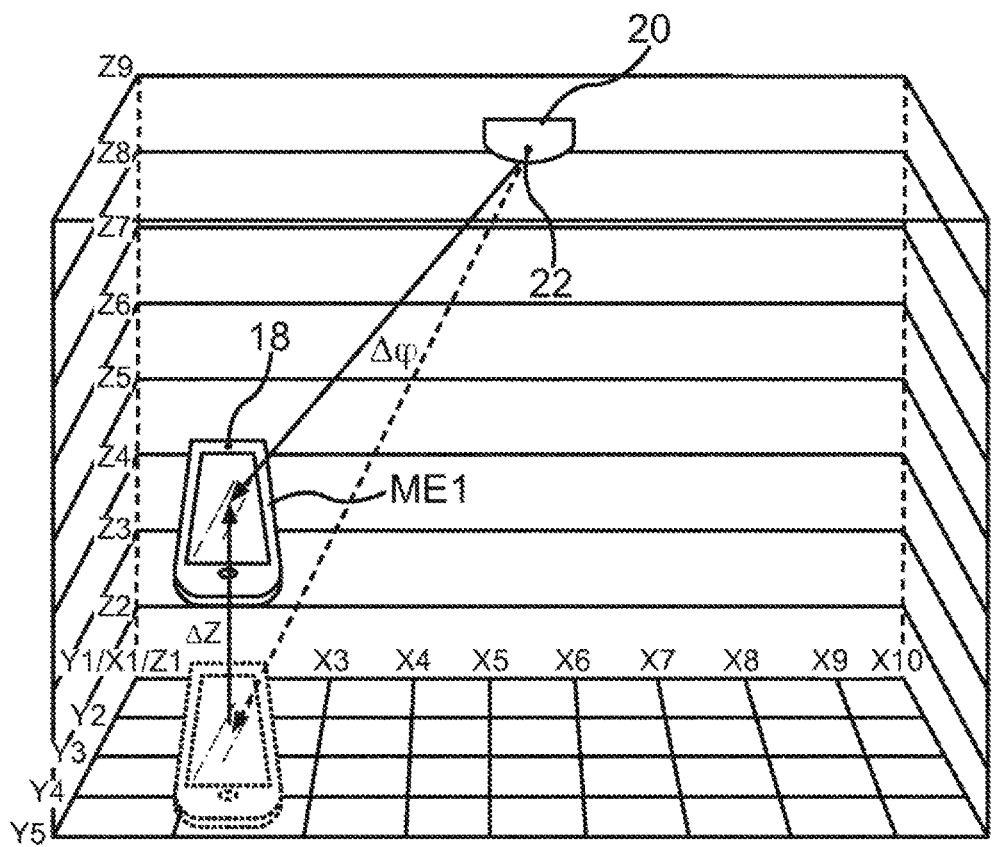
FIG. 3 a third embodiment of a tracking system according to the present disclosure.

FIG. 3 shows a further embodiment of a tracking system according to the present disclosure, wherein the light sources 12, modulators 14 and the central control unit 24 have been omitted for the sake of clarity. In this case the light sensor 20 is designed to create a virtual three-dimensional grid structure in a learning process, for defining an orientation of its camera 22. The light sensor 20 can be designed, when creating the virtual three-dimensional grid structure, to take into consideration features of a room in which the light sensor 20 is arranged, in particular, the position of walls, windows and doors, the orientation of walls, windows and doors and also the height, width and length of the room.

In the tracking system 10, in particular in the mobile communication unit ME1 and/or in the central control unit 24, a predefinable position $\Delta Z$ of the mobile communication unit ME1 in the vertical direction can be stored. The tracking system 10, in particular the mobile communication unit ME1 and/or the central control unit 24, can be designed to take into account this predefinable position $\Delta Z$ when determining the position of the mobile communication unit ME1. As the diagram of FIG. 3 clearly shows, an angular difference $\Delta \varphi$ is obtained between two positions, where in the first position it is assumed that the mobile communication unit ME1 is located on the floor of the room, while in the second position it is arranged at a height $\Delta Z$ above the floor. By taking into account a suitable vertical position, parallax errors can be reliably avoided. Having knowledge of the vertical position $\Delta Z$, the tracking system 10 can determine and identify the carrier of the mobile communication unit ME1 at a different location, than without this knowledge. In particular, if a plurality of persons or objects with mobile communication units are located close together or between the mobile communication unit ME1 to be tracked and the light sensor 20, the search for the carrier of the mobile communication unit ME1 to be tracked can thus be carried out considerably more precisely.

In one exemplary application an app, which can be loaded onto a mobile communication unit ME1 and activated there, can be provided by a shop. This can be used to upload a shopping list onto a server of the shop. When the app is activated, by receiving an identification information item and forwarding data correlated therewith to a server of the shop, a tracking operation can be initiated. The customer can then be tracked and, for example, be conducted through the shop in such a way that he can process his shopping list on the shortest distance possible. Additionally or alternatively, the navigation can take place in such a way that during his shopping trip the customer is navigated to places in which promotions are exhibited.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A tracking system comprising:
   at least one light source, which is designed to broadcast a unique identification information item associated with the light source using a light signal; and
   a mobile communication unit having a camera, wherein the mobile communication unit is designed to receive with the aid of its camera the identification information item broadcast by the at least one light source;

the tracking system further comprising:
  at least one light sensor with a camera; and
  a central control unit which is at least coupled to the at least one light sensor;
  wherein upon receipt of the identification information item, the mobile communication unit is further designed to broadcast an activation signal to the central control unit for activating a tracking operation, the activation signal comprising data correlated with the received identification information item;
  wherein the central control unit is designed to determine, on the basis of the activation signal transmitted by the mobile communication unit, at which position the mobile communication unit is arranged and which at least one light sensor is arranged relative to the position of the mobile communication unit in such a way that the mobile communication unit can be detected by the camera of said light sensor, wherein the central control unit is further designed to activate the camera of the at least one detected light sensor for providing image information by means of its camera to the central control unit, in order to determine and identify a carrier of the mobile communication unit at the determined position;
  wherein the central control unit is further designed to activate at least one light sensor which is coupled to said central control unit for tracking the identified carrier of the mobile communication unit.

2. The tracking system as claimed in claim 1, wherein the at least one light sensor is designed to receive with the aid of its camera the identification information item broadcast by the at least one light source and to send data correlated therewith to the central control unit, wherein the central control unit is designed to determine, from a comparison of the data sent by the at least one light sensor to the central control unit with the data sent by the mobile communication unit to the central control unit, which at least one light sensor is arranged relative to the position of the mobile communication unit in such a way that the mobile communication unit can be detected by the camera of said light sensor.

3. The tracking system as claimed in claim 1, wherein in the central control unit the position of the at least one light sensor is stored, the central control unit being designed to determine, by means of an evaluation of the data sent by the mobile communication unit to the central control unit and a comparison of the evaluated data with the stored position of the at least one light sensor, which at least one light sensor is arranged relative to the position of the mobile communication unit in such a way that the mobile communication unit can be detected by the camera of said light sensor.

4. The tracking system as claimed in claim 3, wherein a look-up table is stored in the central control unit, from which, on the basis of the data sent by the mobile communication unit, information about the position of the mobile communication unit can be determined.

5. The tracking system as claimed in claim 3, wherein the identification information item broadcast by the at least one light source contains a position specification of the light source, wherein the central control unit is designed to determine a position of the mobile communication unit from the data sent by the mobile communication unit to the central control unit.

6. The tracking system as claimed in claim 1, wherein the mobile communication unit is designed to determine the relative solid angle under which the at least one light source, the identification information item of which it receives, is arranged relative to the current position of the mobile communication unit.

7. The tracking system as claimed in claim 6, wherein the tracking system is designed to take into account the determined relative solid angle when determining the position of the mobile communication unit.

8. The tracking system as claimed in claim 1, wherein in the tracking system a predefinable position of the mobile communication unit in the vertical direction is stored, wherein the tracking system is designed to take this predefinable position into account when determining the position of the mobile communication unit.

9. The tracking system as claimed in claim 1, wherein the mobile communication unit comprises at least one additional sensor, wherein the tracking system is designed to take into account the measurement values of this at least one additional sensor when determining the position of the mobile communication unit.

10. The tracking system as claimed in claim 1, wherein the at least one light sensor is designed to send a corresponding information item to the central control unit when detecting the carrier of the mobile communication unit.

11. The tracking system as claimed in claim 1, wherein the tracking system is designed to identify features of the carrier of the mobile communication unit, and to take into account said features when tracking the carrier of the mobile communication unit.

12. The tracking system as claimed in claim 1, wherein the at least one light sensor comprises at least one sensor from the following group of sensors:
  at least one microphone, wherein the at least one light sensor is designed to identify by means of the at least one microphone an acoustic feature, and to take said feature into account when tracking the carrier of the mobile communication unit;
  a spectral sensor for carrying out a spectral analysis of a lighting situation.

13. The tracking system as claimed in claim 1, wherein the central control unit is designed, on receipt of an activation signal sent by the mobile communication unit with data that are correlated with the identification information item of the at least one light source, to activate the appropriate light source in such a way that it broadcasts a predefined light signal.

14. The tracking system as claimed in claim 13, wherein the at least one light sensor is designed to receive the predefined light signal and to take it into consideration when tracking the carrier of the mobile communication unit.

15. The tracking system as claimed in claim 1, wherein the at least one light sensor is designed to create a virtual three-dimensional grid structure in a learning process, for defining an orientation of its camera.

16. The tracking system as claimed in claim 15, wherein the at least one light sensor is designed, when creating the virtual three-dimensional grid structure, to take into account features of a room in which the at least one light sensor is arranged.

17. The tracking system as claimed in claim 1, wherein the mobile communication unit is designed to send a navigation request to the central control unit, wherein the central control unit is designed, taking into account the current position of the carrier of the mobile communication unit determined by means of the tracking of the carrier of the mobile communication unit, to broadcast a navigation signal to the mobile communication unit and/or at least one light source coupled with the central control unit.

18. A method for tracking a carrier of a mobile communication unit using a tracking system comprising at least one light source, which is designed to broadcast a unique identification information item associated with the light source using a light signal; and a mobile communication unit having a camera, wherein the mobile communication unit is designed to receive with the aid of its camera the identification information item broadcast by the at least one light source;

the method further comprising:

coupling a central control unit to at least the at least one light sensor;

when the mobile communication unit receives an identification information item from the at least one light source, it sends an activation signal to the central control unit for activating a tracking operation, wherein it forms the activation signal such that it comprises data correlated with the received identification information item;

the central control unit determines, on the basis of the activation signal transmitted by the mobile communication unit, at which position the mobile communication unit is arranged and which at least one light sensor is arranged relative to the position of the mobile communication unit in such a way that the mobile communication unit can be detected by the camera of said light sensor, the central control unit activates the camera of the at least one detected light sensor in such a way that said camera provides image information to the central control unit;

on the basis of this image information the central control unit determines and identifies at the determined position a carrier of the mobile communication unit; and the central control unit activates at least one light sensor which is coupled to said central control unit for tracking the identified carrier of the mobile communication unit.

* * * * *